(12) United States Patent
Rao et al.

(10) Patent No.: US 9,876,699 B2
(45) Date of Patent: Jan. 23, 2018

(54) SYSTEM AND METHOD FOR GENERATING A REPORT IN REAL-TIME FROM A RESOURCE MANAGEMENT SYSTEM

(71) Applicant: Wipro Limited, Bangalore (IN)

(72) Inventors: Arjun Kumar Rao, Bangalore (IN); Karthik Kumar, Bangalore (IN); Nagadhilipan Dhakshinamoorthy, Narimedu Madurai (IN)

(73) Assignee: Wipro Limited, Bangalore (IN)

( * ) Notice: Subject to any disclaimer, the term of this patent is extended or adjusted under 35 U.S.C. 154(b) by 302 days.

(21) Appl. No.: 14/961,476

(22) Filed: Dec. 7, 2015

(65) Prior Publication Data

US 2017/0118094 A1   Apr. 27, 2017

(30) Foreign Application Priority Data

Oct. 21, 2015   (IN) .......................... 5675/CHE/2015

(51) Int. Cl.

| G06F 15/173 | (2006.01) |
|---|---|
| H04L 12/26 | (2006.01) |
| H04W 12/06 | (2009.01) |
| G06Q 10/06 | (2012.01) |
| G06Q 10/08 | (2012.01) |
| H04L 29/06 | (2006.01) |

(52) U.S. Cl.
CPC ......... *H04L 43/10* (2013.01); *G06Q 10/0631* (2013.01); *G06Q 10/087* (2013.01); *H04L 63/083* (2013.01); *H04W 12/06* (2013.01)

(58) Field of Classification Search
USPC ....... 709/203, 206, 217, 219, 223, 224, 226, 709/228, 231, 232, 238; 715/261; 706/12, 45; 1/1
See application file for complete search history.

(56) References Cited

U.S. PATENT DOCUMENTS

| 7,287,012 | B2 * | 10/2007 | Corston ............ G06F 17/30687 706/12 |
|---|---|---|---|
| 7,392,232 | B1 * | 6/2008 | Wizdo ................. G06N 99/005 706/45 |
| 8,600,793 | B2 | 12/2013 | Wang et al. |
| 8,838,465 | B2 | 9/2014 | Goldberg et al. |
| 9,619,756 | B2 * | 4/2017 | Rajendraprasad ... G06N 99/005 |
| 9,646,262 | B2 * | 5/2017 | Phillipps .............. G06N 99/005 |
| 2007/0239508 | A1 | 10/2007 | Fazal et al. |
| 2008/0086495 | A1 | 4/2008 | Kiziltunc et al. |
| 2012/0284312 | A1 | 11/2012 | Gore et al. |
| 2013/0197953 | A1 | 8/2013 | Sholes et al. |

(Continued)

FOREIGN PATENT DOCUMENTS

EP   2811432 A1   1/2012

*Primary Examiner* — Quang N Nguyen
(74) *Attorney, Agent, or Firm* — LeClairRyan, a Professional Corporation

(57) ABSTRACT

A system and method for generating a report in real-time from a resource management system includes: receiving a plurality of parameters related to the report from a user; identifying required data from the resource management system based on the plurality of parameters; extracting refined data from the resource management system based on the identified required data using a data mining algorithm; and generating a report in real-time based on the extracted refined data.

18 Claims, 3 Drawing Sheets

(56) References Cited

U.S. PATENT DOCUMENTS

| | | | |
|---|---|---|---|
| 2015/0170536 A1* | 6/2015 | Lan | G09B 7/02 |
| | | | 434/350 |
| 2015/0199616 A1* | 7/2015 | Rajendraprasad | G06N 99/005 |
| | | | 706/12 |
| 2016/0103808 A1* | 4/2016 | Anders | G06F 17/24 |
| | | | 715/261 |
| 2017/0070842 A1* | 3/2017 | Kulp | H04L 12/2803 |

\* cited by examiner

SYSTEM AND METHOD FOR GENERATING A REPORT IN REAL-TIME FROM A RESOURCE MANAGEMENT SYSTEM

This application claims the benefit of Indian Patent Application Serial No. 5675/CHE/2015 filed Oct. 21, 2015, which is hereby incorporated by reference in its entirety.

FIELD

This disclosure relates generally to resource management system, and more particularly to a system and method for generating a report in real-time from a resource management system.

BACKGROUND

Resource management systems, such as enterprise resource planning (ERP) systems, are employed to gather and manage information from the multiple different verticals of an organization. A business user of a resource management system typically needs to create reports based on data from the resource management system. These reports are highly personalized depending on an object of the report and a personal liking of the business user and are therefore not pre-configured in the standard resource management system. Traditional report generation techniques involve manually generating reports by extracting data from the resource management system. However, there are many challenges that make it difficult for the business or functional users to create reports in the resource management system using traditional report generation techniques.

For example, the manually generated reports may include errors as well as disastrously wrong interpretation of data. Additionally, it is time consuming to manually generate reports at regular intervals. Further, real-time report generation is not possible currently from a resource management system and specifically from an ERP based supply chain management (SCM) and planning system. Moreover, the reports are typically not available to the users via remote access and the users are therefore not able to view the reports as and when required. Thus, traditional report generation techniques are manual, error prone, tedious, and time consuming, and therefore inefficient. Moreover, in the present resource management systems no real-time reports are being generated.

In a business involving supply chain management, the resource management system executes background jobs or processes to carry out daily planning activities. For example, a background process may be developed to automate the planning and forecasting activity. In today's business scenarios, extracting accurate data (especially from a large database) for performing business analytics and for subsequent reporting is critical to the success of the business. Additionally, formulating demand plan, supply plan, or production plan based on such analytics and reports is critical to the success of the business. The techniques involved in generating these plans are very tedious and any wrong report will affect the company sales, thereby causing revenue loss and other technical issues such as surplus inventories, lag in lead time, wrong production and confirmations, and so forth. Hence, there is a need to report the status of the background jobs or processes for an operational date so as to ensure the business to carry out its daily planning activities.

It is therefore desirable to provide an improved report generation technique for resource management systems that addresses the issues stated above. It is also desirable to provide a technique to closely monitor background jobs and processes used in sales and operational planning and generate real-time reports for resource management systems and specifically for ERP based supply chain management (SCM) and planning systems.

SUMMARY

In one embodiment, a method for generating a report from a resource management system is disclosed. In one example, the method comprises receiving a plurality of parameters related to the report from a user. The method further comprises identifying required data from the resource management system based on the plurality of parameters. The method further comprises extracting refined data from the resource management system based on the identified required data using a data mining algorithm. The method further comprises generating a report in real-time based on the extracted refined data.

In one embodiment, a system for generating a report from a resource management system is disclosed. In one example, the system comprises at least one processor and a memory communicatively coupled to the at least one processor. The memory stores processor-executable instructions, which, on execution, cause the processor to receive a plurality of parameters related to the report from a user. The processor-executable instructions, on execution, further causes the processor to identify required data from the resource management system based on the plurality of parameters. The processor-executable instructions, on execution, further causes the processor to extract refined data from the resource management system based on the identified required data using a data mining algorithm. The processor-executable instructions, on execution, further cause the processor to generate a report in real-time based on the extracted refined data.

In one embodiment, a non-transitory computer-readable medium storing computer-executable instructions for generating a report from a resource management system is disclosed. In one example, the stored instructions, when executed by a processor, cause the processor to perform operations comprising receiving a plurality of parameters related to the report from a user. The operations further comprise identifying required data from the resource management system based on the plurality of parameters. The operations further comprise extracting refined data from the resource management system based on the identified required data using a data mining algorithm. The operations further comprise generating a report in real-time based on the extracted refined data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
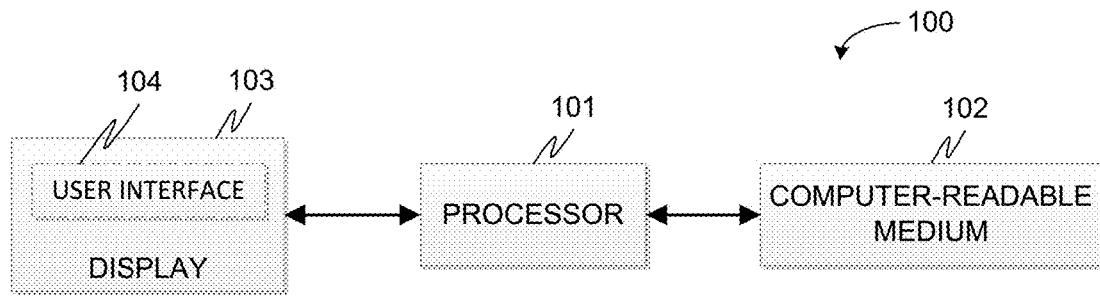
FIG. 1 is a block diagram of an exemplary system for generating a report in real-time from a resource management system in accordance with some embodiments of the present disclosure.

Referring now to FIG. 1, an exemplary system 100 for generating a report in real-time from a resource management system is illustrated in accordance with some embodiments of the present disclosure. In particular, the system 100 implements a real-time reporting engine for generating a report in real-time from the resource management system. The real-time reporting engine interacts with users, identifies and extracts data from the resource management systems using machine learning and data mining algorithms, and generates reports in real-time based on the extracted data. The system 100 comprises one or more processors 101, a computer-readable medium (e.g., a memory) 102, and a display 103. The computer-readable medium 102 stores instructions that, when executed by the one or more processors 101, cause the one or more processors 101 to perform generating a report in real-time from a resource management system in accordance with aspects of the present disclosure. The system 100 interacts with users via a user interface 104 accessible to the users via the display 103 and interacts with resource management systems via the one or more processors 101.

Figure 2:
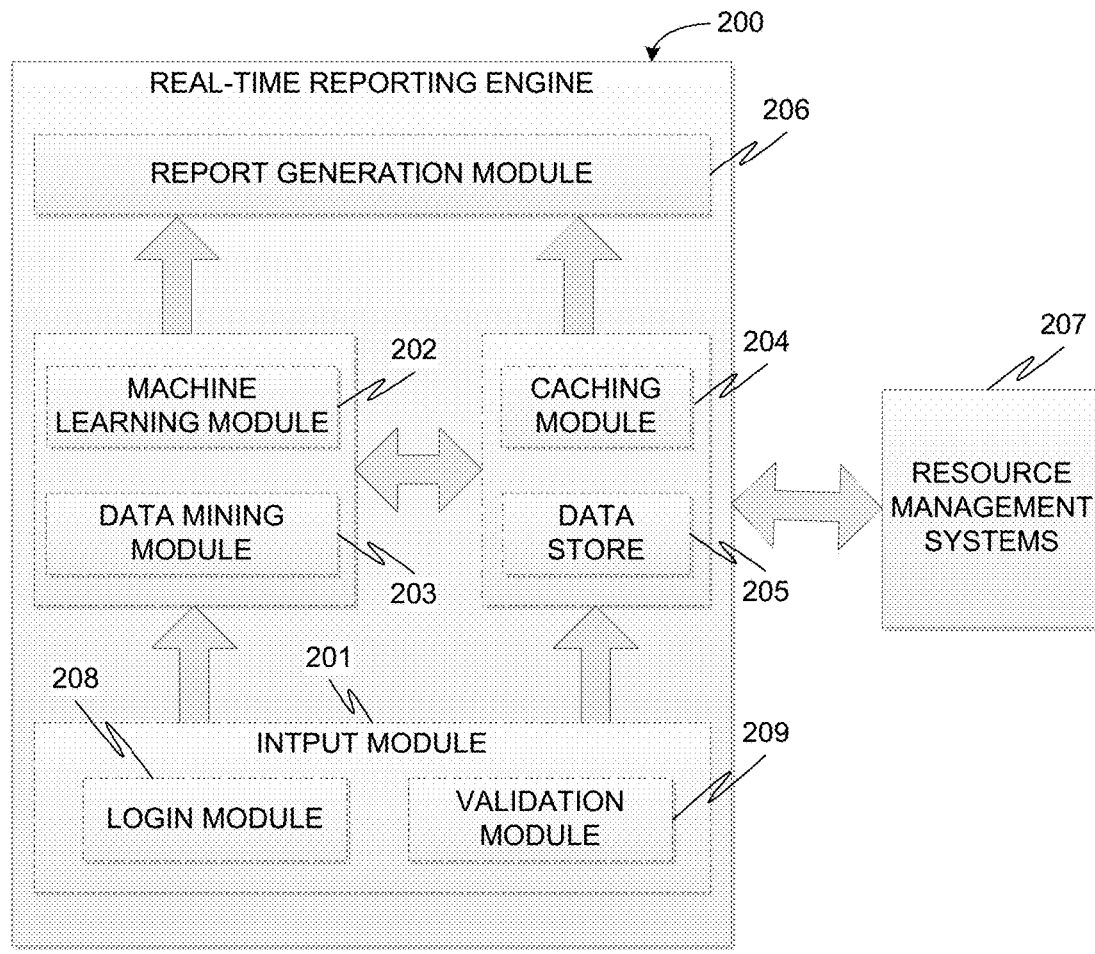
FIG. 2 is a functional block diagram of a real-time reporting engine in accordance with some embodiments of the present disclosure.

Referring now to FIG. 2, a functional block diagram of a real-time reporting engine 200 implemented by the system 100 of FIG. 1 is illustrated in accordance with some embodiments of the present disclosure. As will be described in greater detail below, the real-time reporting engine 200 interacts with multiple users and resource management systems, receives a plurality of parameters related to desired reports from the users, identifies required data from the resource management systems based on the plurality of parameters using a machine learning algorithm, extracts refined data from the resource management systems based on the identified required data using a data mining algorithm, generates the desired reports in real-time based on the refined data, and so forth. In some embodiments, the real-time reporting engine 200 comprises an input module 201, a machine learning module 202, a data mining module 203, a catching module 204, a data store 205, and a report generation module 206.

The input module 201 receives authentication information from a user and provides a role based access to the user on the resource management system 207. The inputs module 201 receives input from the user via a user interface. The input module 201 may further include one or more sub-modules to receive authentication information and any other information that may be required from the user for generating desired report such as parameters related to the report. In some embodiments, the input module 201 may include a login module 208 and a validation module 209. The login module 208 allows the user to enter his/her authentication information (e.g., login credentials) to login to the resource management system 207. The validation module 209 validates the authentication information entered by the user and enables access to the resource management system 207 providing options based on the authorization levels of the user.

The resource management systems 207 comprise of all business critical information and enables real-time reporting engine 200 to extract the real-time data required for reporting. In some embodiments, the resource management systems 207 may be enterprise resource planning (ERP) systems such as SAPTM. Further, in some embodiments, the resource management systems 207 may be ERP based supply chain management (SCM) and planning systems.

The machine learning module 202 has cognitive learning capabilities. Such cognitive learning capabilities enable the machine learning module 202 to learn from the activities performed by user while accessing the resource management systems 207. Based on an initial input with respect to the report from the user, the machine learning module 202 operates to navigate and identify required data from the resource management system for extraction and for subsequent analysis and prediction. As will be appreciated, the users or planners provide different inputs to gather the appropriate data for their day to day planning.

The data mining module 203 extracts the refined data from the resource management system 207 based on the data identified by the machine learning module 202. The data is extracted from various jobs or process chains, optimized as per the requirement and user inputs, and represented in an understandable form to the report generation module 206. In some embodiments, the extracted data may be formatted in a way to help the user or the planner to plan accordingly with their desired requirement.

The data store 205 stores the raw data extracted from the resource management system 207. The catching module 204 provides a high speed mechanism for executing the algorithms in the machine learning module 202. The machine learning algorithms are executed in such a way that if two or more users are querying for same or similar data, or form same or similar jobs or processes, or for similar planning, the catching module 204 automatically collects the input and switches instructions instantaneously resulting in better and efficient performance of the real-time reporting engine 200.

The report generation module 206 generates the reports based on the extracted data received from the data mining module 203. In some embodiments, generating the report may include analyzing the refined data to derive at least one of a forecast, a plan, and a strategy. Such forecasting, planning, or strategy may be with respect to sales and operation sales and operational planning. The report generation module 206 generates the reports in an understandable form (i.e., in a form the user desires and understands). For example, the report may include dash board, graphical view, charts and bar graphs, R-C table form, and so forth. The reports are then presented to the users based on an authorization level of the user. In some embodiments, the reports may be delivered to the user in electronic or paper form. Alternatively, in some embodiments, the reports may be stored on a server and made available to the user via remote access at any point of time over a personal or portable smart device.

It should be noted that the real-time reporting engine 200 may be implemented in programmable hardware devices such as programmable gate arrays, programmable array logic, programmable logic devices, and so forth. Alternatively, the real-time reporting engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

Figure 3:
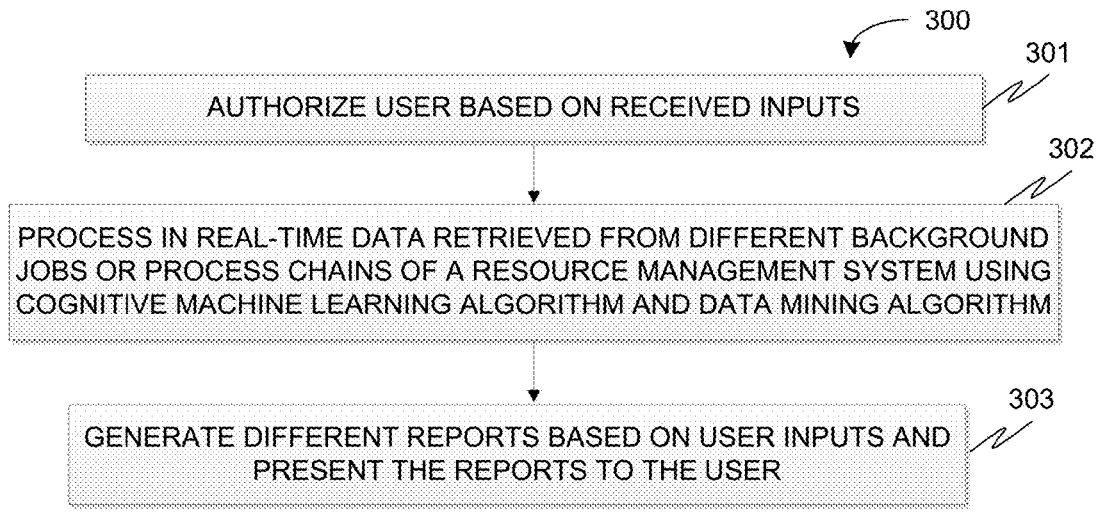
FIG. 3 is a flow diagram of an exemplary process overview for generating a report in real-time from a resource management system in accordance with some embodiments of the present disclosure.

Referring now to FIG. 3, an overview of an exemplary process 300 for generating a report in real-time from a resource management system is depicted via a flowchart in accordance with some embodiments of the present disclosure. The process 300 involves the steps of authorizing user based on received inputs at step 201, processing in real-time data retrieved from different background jobs or process chains of a resource management system using cognitive machine learning algorithm and data mining algorithm at step 202, and generating different reports based on user inputs and presenting the reports to the user at step 203. Each of these steps will be described in greater detail herein below.

At step 201, a user logs into the system through the login module by providing authentication information (i.e., his/her login credentials). The user is then provided access to the resource management system after validating the authentication information using the validation module. As stated above, the user is confined to certain access levels depending on the authorization he/she possesses. For example, in most of the business scenarios, the operational lead or manager of a team might be in need of reports at any time. So the operational lead or manager must possess better or higher authorization than the standard user to extract the data required.

Typically, different types of users include an operational user, a business user, a standard user, and so forth. The operational users may have the highest privilege and authorizations to choose and view all the available reports across the jobs or process chains of the resource management system. The business users may have the privilege to view reports confined only to the planning level unlike operational users. The business users may view the formulated plan at any time. The standard users have the standard privilege to view the overall status of the jobs or process chains and do not have access to view the planning information unlike business users. The type of user is generally identified using the authentication information (e.g., unique identification) of the user. A unique identification and a corresponding password is provided with certain authorities when the user is registered in the resource management system. The user is prompted for the unique identification and the password which is entered through the login module and validated by the validation module. The validation module examines the authority of the user and puts across a relevant user interface with different options for different types of users.

At step 202, the inputs provided by the user are further provided to the machine learning module for identifying and retrieving the required data from the resource management systems. The inputs may be one or more parameters related to the report and correspond to information sought to be included in the report. The machine learning module identifies and retrieves the required data for analysis and prediction using cognitive machine learning algorithm. In some embodiments, identification and retrieval of required data is performed by building one or more queries based on the inputs using the machine learning algorithm. It should be noted that the machine learning algorithm learns to more accurately navigate and identify the required data based on intelligence gathered from one or more activities performed by the user while accessing the resource management system.

The machine learning algorithm studies the day to day common user practice and maps the same as learning process steps. The process steps may have instructions to gather accurate data from the resource management systems according to the user's requirements. In this manner, machine learning module makes use of cognitive learning to analyze the various activities that a user normally does, learns all the steps that it performs to retrieve the output, and also trains the real-time reporting engine accordingly. In the later stages, the machine learning module performs the same task faster as the real-time reporting engine starts using the high speed caching module that gets loaded with various process step instructions very fast.

The data identified by the machine learning module is then provided to the data mining module. The data mining module extracts the refined data from the resource management system based on the required data. Thus, the required data is identified using machine learning module and then the refined data is extracted from the resource management systems using data mining module. Data mining ensures accuracy of data that is extracted from the resource management systems. The refined data is extracted from the different background jobs or process chains based on the analyzed inputs. As will be appreciated by those skilled in the art, most of the data is typically stored in the form of tables in the resource management systems. The jobs or process chains also have dedicated tables that keep track of the logs of corresponding jobs or process chains. Once the data mining module is triggered, it retrieves the data available in the one or more log tables pertaining to the one or more jobs or process chains from the resource management system.

It should be noted that different types of data may be retrieved from the different jobs or process chains of the resource management systems for processing and generating reports. Typically, the different types of data may include, but are not limited to, batch status data, currently running jobs data, jobs failed data, demand plan, supply plan, production plan, and so forth. The batch status data include status of the process chains or background jobs which runs for various regions around the world such as Asia-Pacific (APAC), Europe-Middle East-Africa (EMEA), and the North America-South America (America), and so forth. Status would include fields such as job name, start time, end time, current status of the job (e.g., running, finished, or failed), completion time of the job based on a service level agreement, and so forth. The currently running jobs data provides complete list of all the jobs that are currently running for a specific region. The jobs failed data provides list of jobs that has failed based on the time horizon that the user wishes to view. The demand plan is a statistical plan generated by the system upon taking into consideration current history along with all the different considerations and outliers. The supply plan provides complete procurement, supply planning activities, and logistics related activities that the user wishes to see via dash board or report. The production plan provides the complete set of activities that is planned on tactical level for production for day/week or a month.

By way of an example, in a SAP based resource management system, a typical way of knowing the status of a process chain would include the following steps:

Enter the System;
Use transaction code (T-Code) ST13
Type in business warehousing tools (BW-TOOLS)
Execute
Enter Job name specifying the region e.g.: "*PAZ*EUR*" and set
FROM and TO dates
Execute The above steps are written as process steps and loaded into the machine learning module. The machine learning module analyses, learns, and performs the same steps to get the data from resource management system whenever the option "BATCH STATUS" is inputted by the user. On executing this above process steps, the data mining module would subsequently extract the data required for reporting and provide the extracted data to the report generation module for generating the required reports. In this way, the 'Batch Status' is made available in real-time to the user as he/she can receive the status instantaneously at any moment.

At step 203, the refined data is provided to the report generation module for generating real-time reports based on user requirements. The data retrieved or extracted from the resource management systems based on the user input using machine learning module and data mining module is then provided to the report generation module in a compatible format where the data is further formatted and represented according to the users' requirements. For example, if a demand planner wants to view the forecast plan for specific planning area the data mining module retrieves the data from the resource management system. The refined data is then transferred to report generation module where the data is formatted and represented in a way that the planner can understand. Thus, the data is formatted and represented based on a type and an object of the report. Further, in some embodiments, the refined data may be analyzed to derive at least one of a forecast, a plan, and a strategy which is then included in the reports. In the resource management system related to supply chain management (SCM) and planning, the reports may include, but are not limited to, a bill of material (BOM) report, a batch status report, a job status report, a job processing report, an inventory report, a demand plan, a supply plan, a production plan, and so forth.

The reports are then presented to the users via one or more means. For example, in some embodiments, the user may view or print the reports via the user interface. Alternatively, in some embodiments, the user may store the report for subsequent access not just in the system or the user device but also on the mobile cloud. The mobile cloud enables the user to view the saved file any time anywhere when the user is connected to the Internet. Thus, based on the option selected by the user, the report is uploaded and stored in the cloud, enabling the user to view the report from the cloud.

As will be appreciated by one skilled in the art, a variety of processes may be employed for generating a report in real-time from a resource management system. For example, the exemplary system 100 and the associated real-time reporting engine 200 may generate reports in real-time form the resource management systems by the processes discussed herein. In particular, as will be appreciated by those of ordinary skill in the art, control logic and/or automated routines for performing the techniques and steps described herein may be implemented by the system 100 and the associated real-time reporting engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
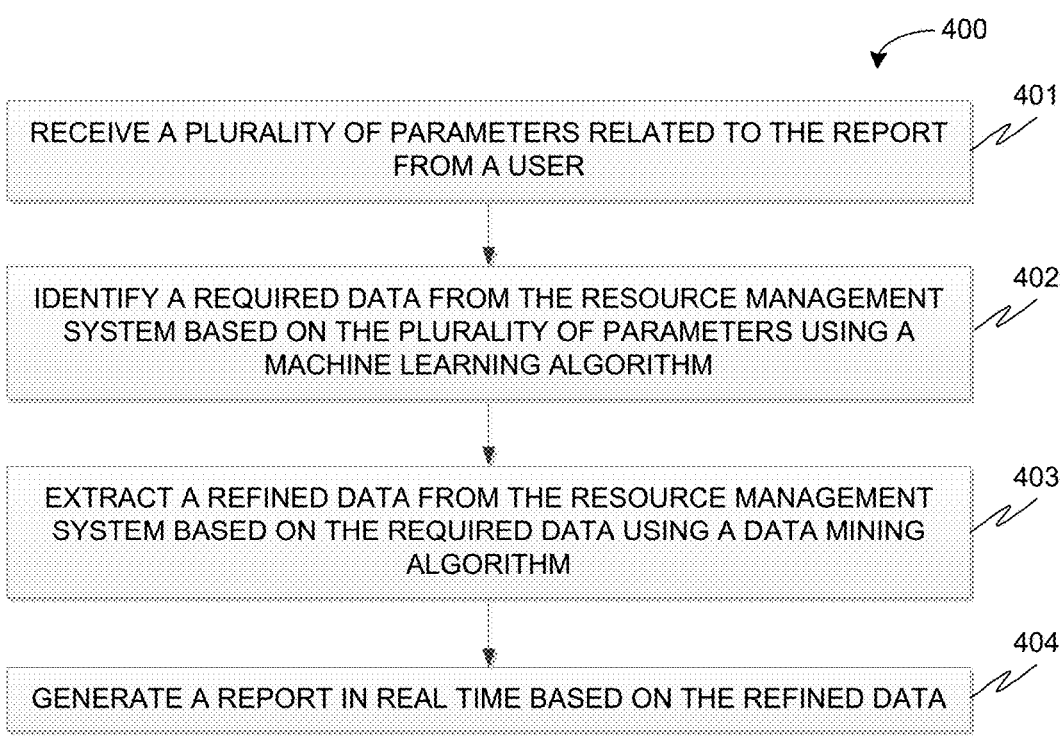
FIG. 4 is a flow diagram of an exemplary process for generating a report in real-time from a resource management system in accordance with some embodiments of the present disclosure.

For example, referring now to FIG. 4, exemplary control logic 400 for generating a report in real-time from a resource management system via a system, such as system 100, is depicted via a flowchart in accordance with some embodiments of the present disclosure. As illustrated in the flowchart, the control logic 400 includes the steps of receiving a plurality of parameters related to the report from a user at step 401, identifying required data from the resource management system based on the plurality of parameters using a machine learning algorithm at step 402, extracting refined data from the resource management system based on the required data using a data mining algorithm at step 403, and generating a report in real-time based on the refined data at step 404. In some embodiments, the control logic 400 may further include the step of providing a role based access to the user on the resource management system based on authentication information provided by the user. Additionally, in some embodiments, the control logic 400 may further include the step of initiating a learning process for the machine learning algorithm to more accurately navigate and identify the required data based on intelligence gathered from one or more activities performed by the user while accessing the resource management system. Further, in some embodiments, the control logic 400 may further include the step of presenting the report to the user by storing the report for subsequent access by the user.

As noted above, in some embodiments, the resource management system is an enterprise resource planning (ERP) system. Further, in some embodiments, the plurality of parameters correspond to information sought to be included in the report. In some embodiments, the resource management system relates to a supply chain management (SCM) and planning and the reports include at least one of a bill of material (BOM) report, a batch status report, a job status report, a job processing report, an inventory report, a demand plan, a supply plan, and a production plan.

In some embodiments, identifying the required data at step 402 comprises building one or more queries based on the plurality of parameters using the machine learning algorithm. Additionally, in some embodiments, extracting the refined data at step 403 comprises retrieving data available in a plurality of log tables pertaining to one or more processes from the resource management system using the data mining algorithm. Further, in some embodiments, generating the report at step 404 comprises analyzing the refined data to derive at least one of a forecast, a plan, and a strategy.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
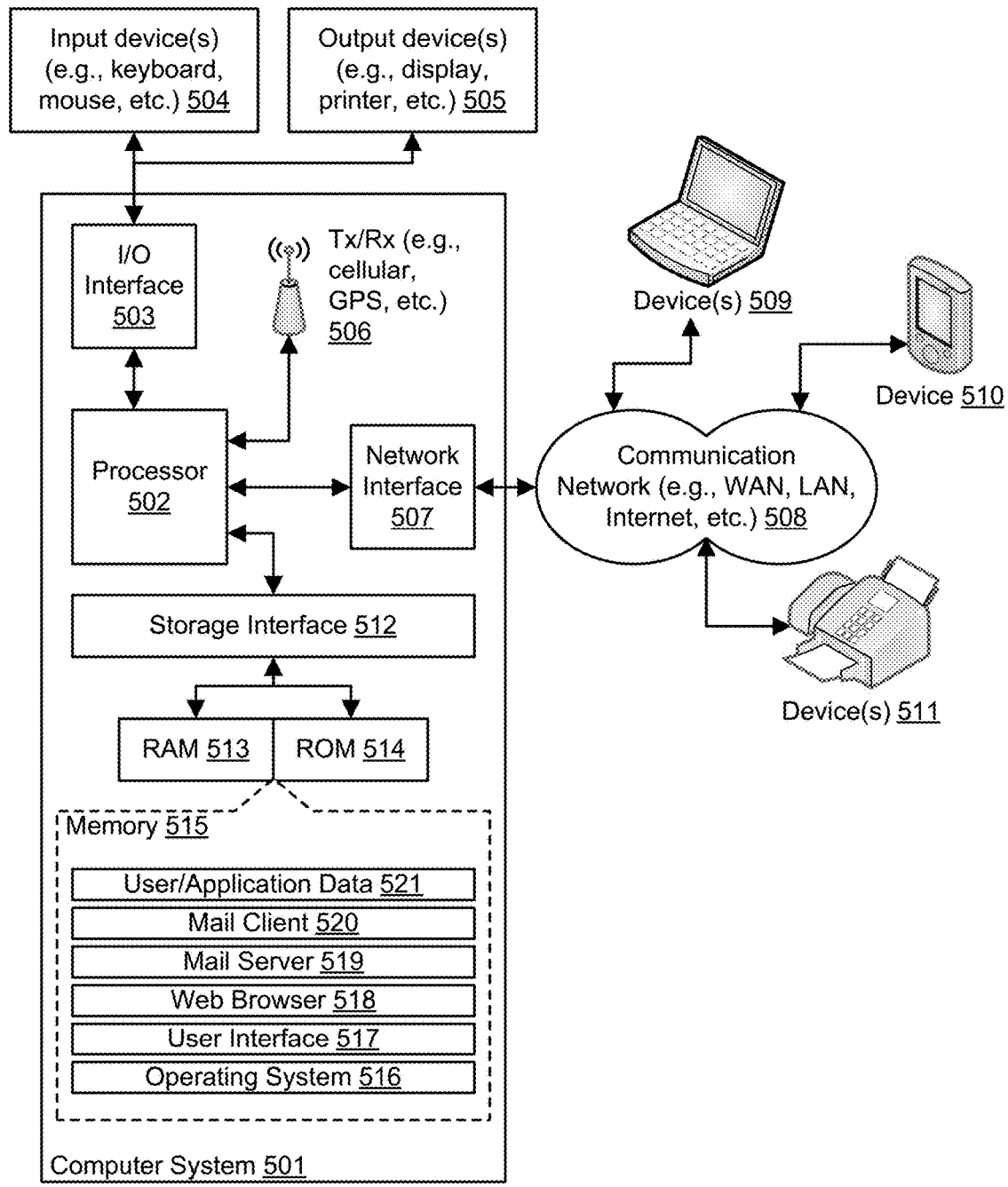
FIG. 5 is a block diagram of an exemplary computer system for implementing embodiments consistent with the present disclosure.

Referring now to FIG. 5, a block diagram of an exemplary computer system, such as a report management computing device 501 in this particular example, for implementing embodiments consistent with the present disclosure is illustrated. Variations of computer system or device 501 may be used for implementing system 100 and real-time reporting engine 200 for generating reports in real-time from resource management systems. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 413, ROM 414, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface

517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., user inputs, authentication information, required data, refined data, reports, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in real-time generation of reports for the resource management system and specifically for ERP based supply chain management (SCM) and planning systems, thereby enabling the users to view all the planned activities for a given period and to optimize sales and operational planning accordingly. The techniques provide for sharing the real-time reports and optimized plans over cloud platforms, thereby enabling the user to view the reports and plans any time and from any place. The use of catching results in retrieval of requested data within optimal time, thereby increasing reporting efficiency.

Further, the techniques described in the various embodiments discussed above make collaborative use of cognitive machine learning algorithms and data mining algorithms for identification and extraction of accurate data requested by the user from the resource management systems. The machine learning is used for navigating and identifying the correct data required for extraction. It analyzes the data and performs different steps or actions that it learns from daily business activities before the necessary data extraction takes place. Data mining helps in extracting accurate data that is identified by the machine learning. The collaborative use of cognitive machine learning and data mining therefore result in reduction of manual efforts in extracting accurate data and automating data extraction for real-time reporting.

The specification has described system and method for generating a report in real-time from a resource management system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating a report from a resource management system, the method comprising:
   receiving, by a processor, a plurality of parameters relating to a report to be generated;
   initiating, by the processor, a learning process to identify required data from a resource management system based on the plurality of parameters and intelligence data gathered from one or more performed activities executed during one or more accesses of the resource management system, wherein the resource management system relates to supply chain management (SCM) and planning;
   extracting, by the processor, refined data from the resource management system based on the identified required data using a data mining algorithm; and generating, by the processor, the report in real-time based on the extracted refined data, wherein the report comprises at least one of a bill of material report, a batch status report, a job status report, a job processing report, an inventory report, a demand plan, a supply plan, or a production plan.

2. The method of claim 1, further comprising providing, by the processor, access to the resource management system based on provided authentication information.

3. The method of claim 1, wherein the received plurality of parameters correspond to information sought to be included in the report and the method further comprises building, by the processor, one or more queries based on the received plurality of parameters.

4. The method of claim 1, wherein the extracting the refined data further comprises retrieving, by the processor, data available in a plurality of log tables pertaining to one or more processes from the resource management system.

5. The method of claim 1, wherein the generating the report further comprises analyzing the extracted refined data to derive at least one of a forecast, a plan, or a strategy.

6. The method of claim 1, further comprising storing, by the processor, the generated report for subsequent access.

7. A report management computing device comprising:
at least one processor;
a memory coupled to the processor and configured to be capable of executing programmed instructions comprising and stored in the memory to:
receive a plurality of parameters relating to a report to be generated;
initiate a learning process to identify required data from a resource management system based on the plurality of parameters and intelligence data gathered from one or more performed activities executed during one or more accesses of the resource management system, wherein the resource management system relates to supply chain management (SCM) and planning;
extract refined data from the resource management system based on the identified required data using a data mining algorithm; and
generate the report in real-time based on the extracted refined data, wherein the report comprises at least one of a bill of material report, a batch status report, a job status report, a job processing report, an inventory report, a demand plan, a supply plan, or a production plan.

8. The device of claim 7, wherein the processor is further configured to be capable of executing one or more programmed instructions stored in the memory to provide access to the resource management system based on provided authentication information.

9. The device of claim 7, wherein the received plurality of parameters correspond to information sought to be included in the report and the processor is further configured to be capable of executing programmed one or more instructions stored in the memory to build one or more queries based on the received plurality of parameters.

10. The device of claim 7, wherein the processor is further configured to be capable of executing programmed one or more instructions stored in the memory to extract the refined data that further comprises an instruction to retrieve data available in a plurality of log tables pertaining to one or more processes from the resource management system.

11. The device of claim 7, wherein the processor is further configured to be capable of executing programmed one or more instructions stored in the memory to generate the report that further comprises an instruction to analyze the extracted refined data to derive at least one of a forecast, a plan, or a strategy.

12. The device of claim 7, wherein the processor is further configured to be capable of executing programmed one or more instructions stored in the memory to identify the required data that further comprises an instruction to store the generated report for subsequent access.

13. A non-transitory machine readable medium having stored thereon instructions for generating a report from a resource management system, the stored instructions comprise machine executable code, which when executed by at least one processor, causes the processor to:
receive a plurality of parameters relating to a report to be generated;
initiate a learning process to identify required data from a resource management system based on the plurality of parameters and intelligence data gathered from one or more performed activities executed during one or more accesses of the resource management system, wherein the resource management system relates to supply chain management (SCM) and planning;
extract refined data from the resource management system based on the identified required data using a data mining algorithm; and
generate the report in real-time based on the extracted refined data, wherein the report comprises at least one of a bill of material report, a batch status report, a job status report, a job processing report, an inventory report, a demand plan, a supply plan, or a production plan.

14. The non-transitory machine readable medium of claim 13, wherein the machine executable code, when executed by the at least one processor, further causes the processor to provide access to the resource management system based on provided authentication information.

15. The non-transitory machine readable medium of claim 13, wherein the received plurality of parameters correspond to information sought to be included in the report and the machine executable code, when executed by the at least one processor, further causes the processor to build one or more queries based on the received plurality of parameters.

16. The non-transitory machine readable medium of claim 13, wherein the machine executable code, when executed by the at least one processor, further causes the processor to extract the refined data that further comprises an instruction to retrieve data available in a plurality of log tables pertaining to one or more processes from the resource management system.

17. The non-transitory machine readable medium of claim 13, wherein the machine executable code, when executed by the at least one processor, further causes the processor to generate the report that further comprises an instruction to analyze the extracted refined data to derive at least one of a forecast, a plan, or a strategy.

18. The non-transitory machine readable medium of claim 13, wherein the machine executable code, when executed by the at least one processor, further causes the processor to identify the required data that further comprises an instruction to store the generated report for subsequent access.

* * * * *